US010661852B2

(12) United States Patent
Kanemura et al.

(10) Patent No.: US 10,661,852 B2
(45) Date of Patent: May 26, 2020

(54) TO-BE-COOLED BODY PROTECTION STRUCTURE OF SADDLE-RIDDEN VEHICLE

(71) Applicant: HONDA MOTOR CO., LTD., Tokyo (JP)

(72) Inventors: Yuki Kanemura, Wako (JP); Yuji Noguchi, Wako (JP); Kazuki Seri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/279,683

(22) Filed: Feb. 19, 2019

(65) Prior Publication Data

US 2019/0263467 A1 Aug. 29, 2019

(30) Foreign Application Priority Data

Feb. 23, 2018 (JP) .................................. 2018-030839

(51) Int. Cl.
*B62J 23/00* (2006.01)
*B62K 11/04* (2006.01)
*B62J 17/086* (2020.01)

(52) U.S. Cl.
CPC .......... *B62J 23/00* (2013.01); *B62J 2017/086* (2013.01); *B62K 11/04* (2013.01)

(58) Field of Classification Search
CPC .................................. B62J 23/00; B62K 11/04
See application file for complete search history.

(56) References Cited

U.S. PATENT DOCUMENTS 8,141,670 B2 * 3/2012 Hayashi ................. B60K 11/04
180/68.4
2016/0090152 A1 3/2016 Sasaki
2016/0272266 A1 9/2016 Hosoya et al.

FOREIGN PATENT DOCUMENTS

JP 64-44228 A 2/1989
JP 2013-203083 A 10/2013
(Continued)

OTHER PUBLICATIONS

Author Unknown, "SW-MOTECH Aluminum Skid Plate Engine Guard for Suzuki V-Strom 1000 '14-'16 Without Crash Bars," TwistedThrottle.com, XP002792248, Jun. 20, 2019, 2 pages.
(Continued)

*Primary Examiner* — Bryan A Evans
(74) *Attorney, Agent, or Firm* — Birch, Stewart, Kolasch & Birch, LLP

(57) ABSTRACT

In a to-be-cooled body protection structure of a saddle-ridden vehicle, a guard member protects at least a front portion of a to-be-cooled body requiring cooling with a travelling air, straddles over a pair of left and right frame members, is supported to the body frame, and located at a rear of a front wheel. A plurality of through-holes are provided on the guard member, each include at least one linear edge portion linearly extending, and are formed into non-circular shapes. The non-circular through-holes are arranged such that linear ribs are formed between linear edge portions, as said linear edge portion, facing each other of adjacent ones of the non-circular through-holes. Accordingly, while protecting the to-be-cooled body from a small stone etc. jumped up by the front wheel, a larger amount of travelling air is guided to the to-be-cooled body side.

10 Claims, 9 Drawing Sheets

(56) References Cited

FOREIGN PATENT DOCUMENTS

| JP | 2016-041544 A | 3/2016 |
|---|---|---|
| JP | 2016-175488 A | 10/2016 |

OTHER PUBLICATIONS

Extended European Search Report, dated Jul. 10, 2019, for European Application No. 19158099.2.

* cited by examiner

FIG.8
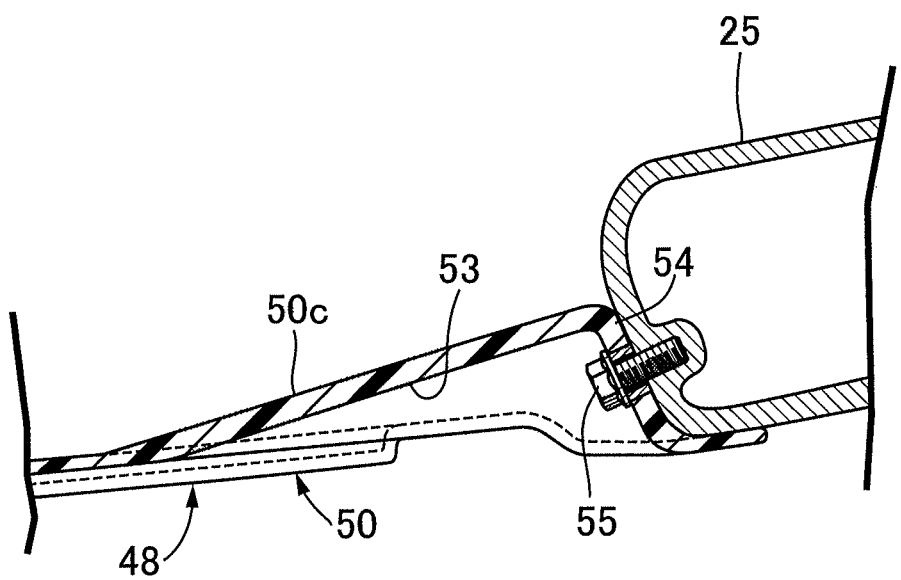
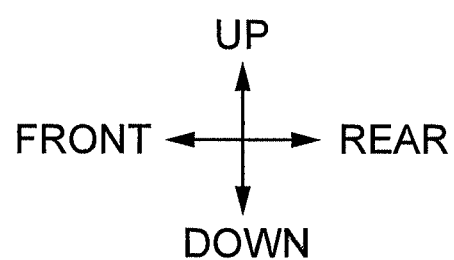

TO-BE-COOLED BODY PROTECTION STRUCTURE OF SADDLE-RIDDEN VEHICLE

BACKGROUND OF THE INVENTION

Field of the Invention

The present invention relates to a to-be-cooled body protection structure of a saddle-ridden vehicle, in which a to-be-cooled body requiring cooling with a travelling air is supported to a body frame including a front fork and a head pipe at a front end portion of the body frame, the front fork journaling a front wheel, the head pipe steerably supporting a steering handlebar, and a guard member straddles over a pair of left and right frame members configuring a part of the body frame, the guard member being supported to the body frame and located at a rear of the front wheel so as to protect at least a front portion of the to-be-cooled body.

Description of the Related Art

There has been known a structure disclosed in Japanese Patent Application Laid-open No. 2016-175488 where a guard member that covers an engine mounted to a two-wheeled motor vehicle from the front side and the lower side is supported to a body frame so as to straddle a pair of left and right lower frames provided in the body frame and a plurality of circular through-holes are provided on the guard member.

The circular through-holes on the guard member disclosed in Japanese Patent Application Laid-open No. 2016-175488 cause travelling air for cooling an oil accumulation at the engine to flow through. However, the through-holes are formed so as to have a diameter to the extent of blocking a passing of, for example, a stone to prevent, for example, the stone jumped up by a front wheel from hitting the engine; therefore, there is a demand that more travelling air is desired to be guided to the engine side.

SUMMARY OF THE INVENTION

The present invention has been made in consideration of the above-described circumstances and an object of the present invention is to provide a to-be-cooled body protection structure of a saddle-ridden vehicle that allows guiding a larger amount of travelling air to a to-be-cooled body side while protecting the to-be-cooled body from, for example, a small stone jumped up by a front wheel.

In order to achieve the object, according to a first aspect of the present invention, there is provided a to-be-cooled body protection structure of a saddle-ridden vehicle, in which a to-be-cooled body requiring cooling with a travelling air is supported to a body frame including a front fork and a head pipe at a front end portion of the body frame, the front fork journaling a front wheel, the head pipe steerably supporting a steering handlebar, and a guard member straddles over a pair of left and right frame members configuring a part of the body frame, the guard member being supported to the body frame and located at a rear of the front wheel so as to protect at least a front portion of the to-be-cooled body, wherein a first plurality of through-holes are provided on the guard member, a second plurality of through-holes as part of the first plurality of through-holes each include at least one linear edge portion linearly extending, and are formed into non-circular shapes, and the non-circular through-holes are arranged such that linear ribs are formed between linear edge portions, as said linear edge portion, facing each other of adjacent ones of the non-circular through-holes.

With the first aspect of the present invention, part of the through-holes provided on the guard member include at least one linearly extending linear edge portion and are formed into the non-circular shapes. The non-circular through-holes adjacent to each other form the linear ribs between the linear edge portions facing one another. Therefore, the non-circular through-holes are approximated to one another while a strength of the guard member is secured with the linear ribs to provide the more non-circular through-holes on the guard member, ensuring increasing the opening areas. Additionally, the larger amount of travelling air can be guided to the to-be-cooled body side while the to-be-cooled body is protected from, for example, a small stone jumped up by the front wheel.

According to a second aspect of the present invention, in addition to the first aspect, the non-circular through-holes are provided on the guard member such that the linear ribs are integrally continuous with other linear ribs, respectively.

With the second aspect of the present invention, the linear ribs are integrally continuous with the other linear ribs. This allows securing the strength of the guard member while the areas occupied by the linear ribs are decreased and the opening areas are increased.

According to a third aspect of the present invention, in addition to the first aspect or the second aspect, the non-circular through-holes are formed into triangles each having three linear edge portions as said linear edge portion, and linear edge portions, as said linear edge portion, corresponding to long sides of the triangles of adjacent ones of the triangular through-holes are located so as to face each other.

With the third aspect of the present invention, the non-circular through-holes are the triangular through-holes each having the three linear edge portions. The triangles are configured such that the three sides are in contact with an outer periphery of an imaginary circle corresponding to a circular through-hole blocking passing of, for example, a small stone to allow increasing the opening areas of the triangular through-holes while blocking the passing of, for example, the small stone. Additionally, the linear edge portions corresponding to the long sides of triangles form the linear ribs between them and face each other, respectively. This enhances an efficiency to locate the triangular through-holes and provides the more triangular through-holes on the guard member, thus ensuring further increasing the opening areas of the guard member.

According to a fourth aspect of the present invention, in addition to the third aspect, the triangles have three apex angles, one of which is set to be an obtuse angle.

With the fourth aspect of the present invention, by configuring the triangular through-holes having the obtuse angle, the linear edge portions corresponding to the long sides of the triangles can be lengthened and the opening areas of the triangular through-holes can be further increased.

According to a fifth aspect of the present invention, in addition to the third aspect or the fourth aspect, the guard member includes a center rib linearly extending at a center portion in a vehicle width direction, and among three linear edge portions provided in each of through-holes selected among the second plurality of triangular through-holes, remaining linear edge portions excluding linear edge portions facing one another of adjacent ones of the selected triangular through-holes are located along the center rib.

With the fifth aspect of the present invention, one of the three linear edge portions of each of the selected triangular through-holes is located along the center rib linearly extending at the center portion in the vehicle width direction of the guard member. This allows enhancing an efficiency to locate the triangular through-holes while the center rib receives, for example, dirt jumped up by the front wheel to effectively block the jumping of the dirt to the to-be-cooled body side.

According to a sixth aspect of the present invention, in addition to the fifth aspect, the guard member made of a synthetic resin integrally includes a pair of left and right bulge portions and a center portion, the pair of left and right bulge portions being located in front of a lower portion of the to-be-cooled body so as to curvedly bulge forward as seen in side view, the center portion being disposed continuous with the bulge portions via step portions such that the second plurality of through-holes are provided, and among three linear edge portions provided in each of remaining through-holes excluding the selected through-holes among the second plurality of triangular through-holes, remaining linear edge portions excluding linear edge portions facing one another of adjacent ones of said triangular through-holes are located along the bulge portions.

With the sixth aspect of the present invention, the guard member made of synthetic resin integrally includes the left and right bulge portions and the center portion, which is disposed continuous with the bulge portions via the step portions. Among the three linear edge portions of each of the remaining through-holes excluding the through-holes selected among the triangular through-holes provided on the center portion, the remaining linear edge portions excluding the linear edge portions facing one another of the adjacent triangular through-holes are located along the bulge portions. Therefore, the step portions are interposed between the center portion on which the second plurality of through-holes are provided and the left and right bulge portions, and the linear edge portions of part of the triangular through-holes run along the step portions. Thus, the weight of the guard member can be reduced while the strength of the guard member is secured.

According to a seventh aspect of the present invention, in addition to the fifth aspect, the second plurality of through-holes are located symmetrical with respect to the center rib.

With the seventh aspect of the present invention, since the second plurality of through-holes are located symmetrical with respect to the center rib, the travelling air equally blows the entire to-be-cooled body, thereby ensuring equally cooling the entire to-be-cooled body.

According to an eighth aspect of the present invention, in addition to the first aspect, the guard member integrally has a front wall and a bottom wall, the front wall being located in front of the lower portion of the to-be-cooled body, the bottom wall extending in a front-rear direction below the to-be-cooled body and being continuous with the front wall, and the through-holes provided on the front wall among the first plurality of through-holes have a total opening area set larger than a total opening area of the through-holes provided on the bottom wall.

With the eighth aspect of the present invention, the opening area at the front wall located in front of the lower portion of the to-be-cooled body is larger than the opening area at the bottom wall, which is continuous with the front wall below the to-be-cooled body. Therefore, the travelling air taken from the front wall can be flown rearward along the bottom wall, and this allows providing the good taking of the travelling air from the front wall while the cooling of the to-be-cooled body is promoted.

Note that lower frames 17 of an embodiment correspond to the frame members of the present invention and an engine E of the embodiment corresponds to the to-be-cooled body of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 8 is a sectional view taken along a line 8-8 in FIG. 5.

DESCRIPTION OF THE PREFERRED EMBODIMENT

Figure 1:
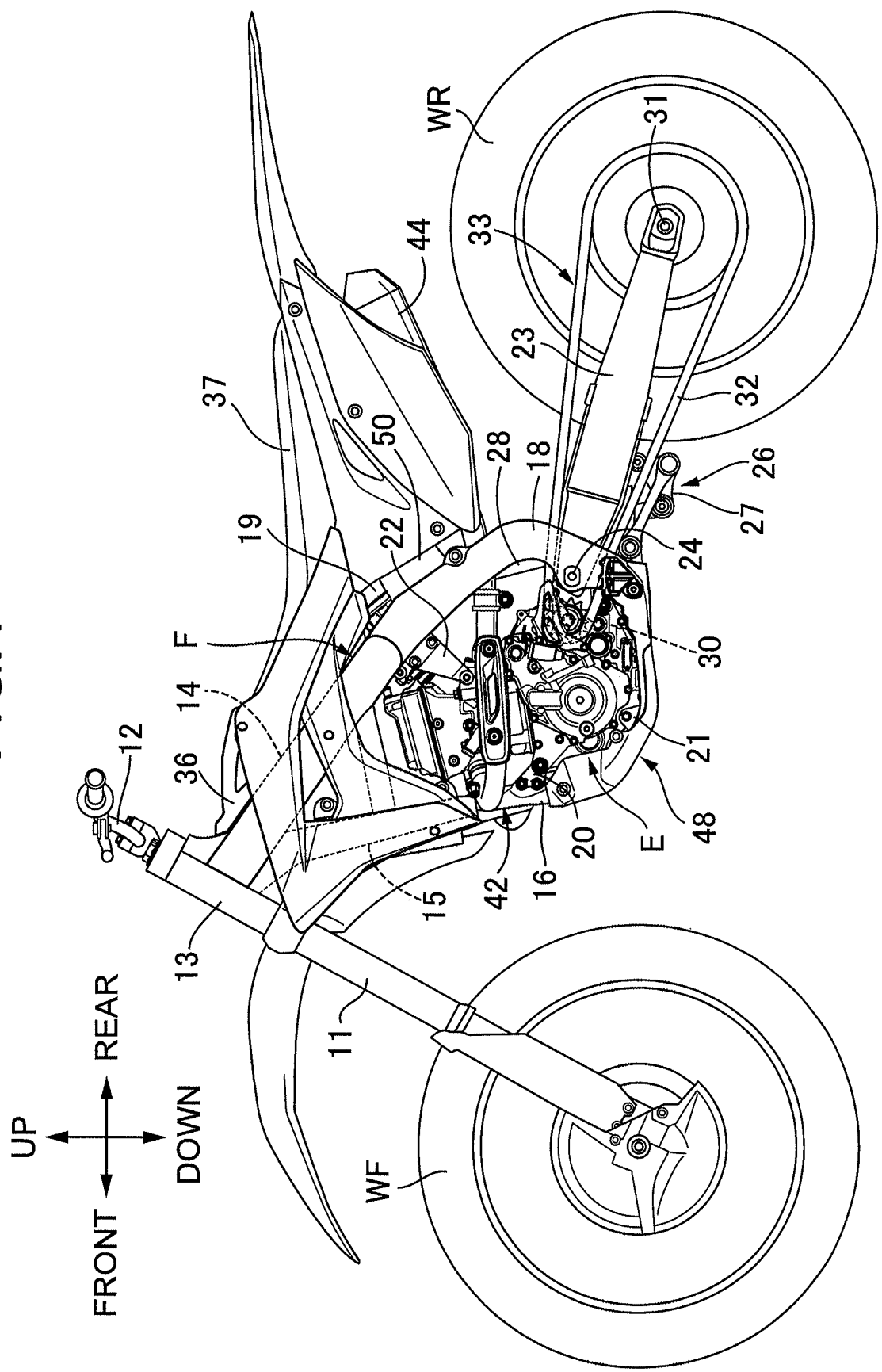
FIG. 1 is a left side view of a two-wheeled motor vehicle.
Figure 2:
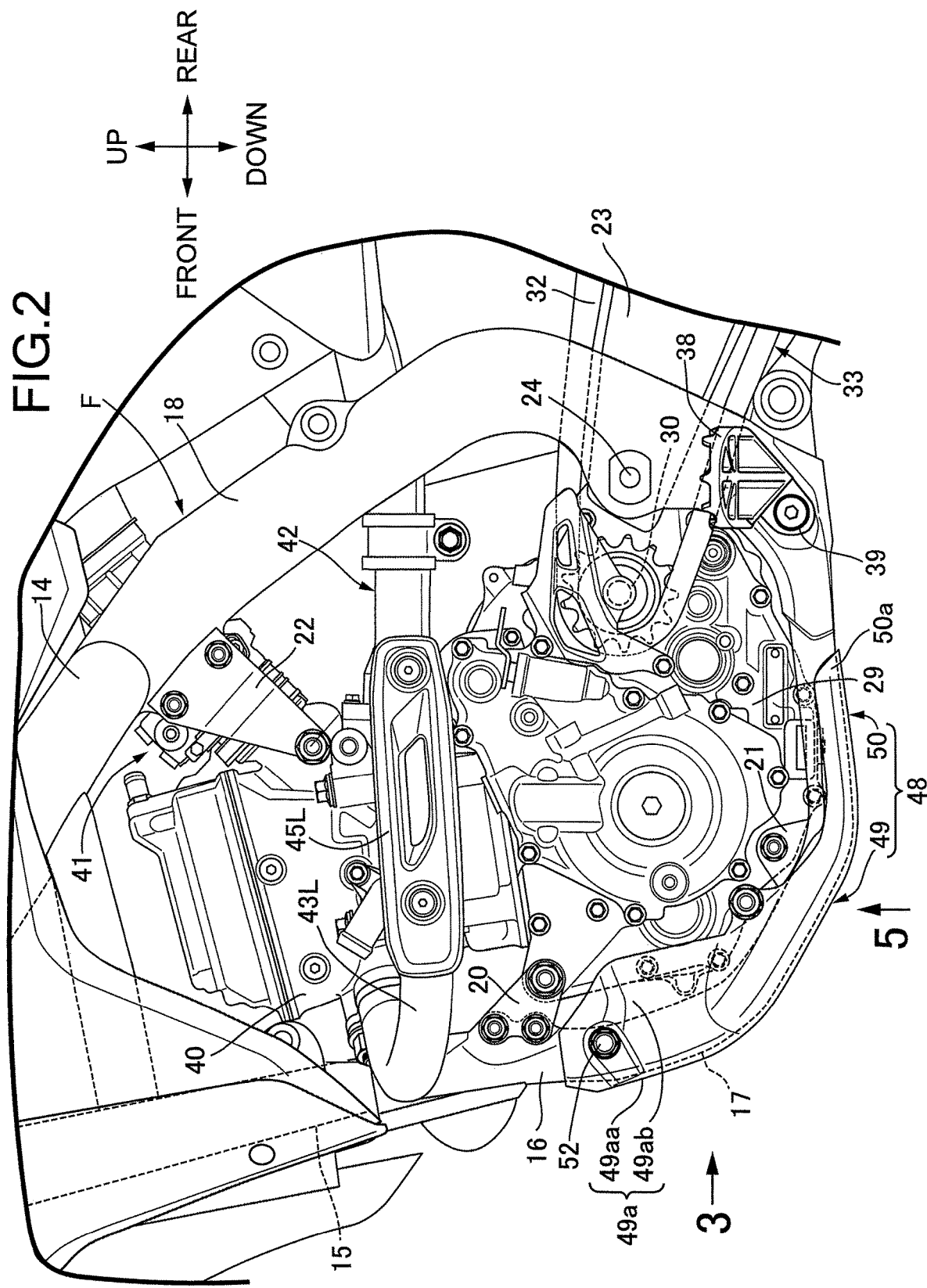
FIG. 2 is an enlarged view of a main part in FIG. 1.
Figure 3:
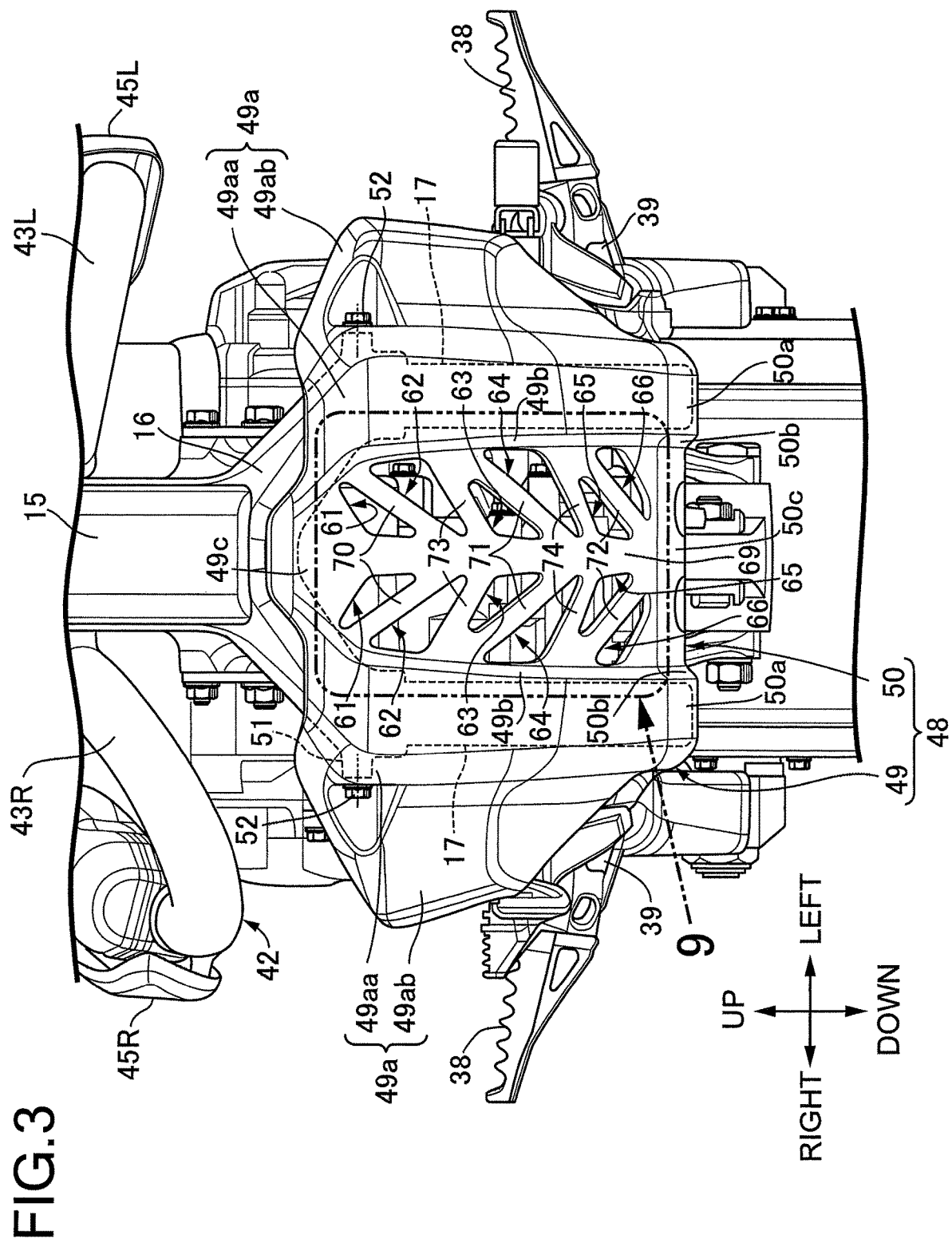
FIG. 3 is a front view viewed from an arrow 3 in FIG. 2.
Figure 4:
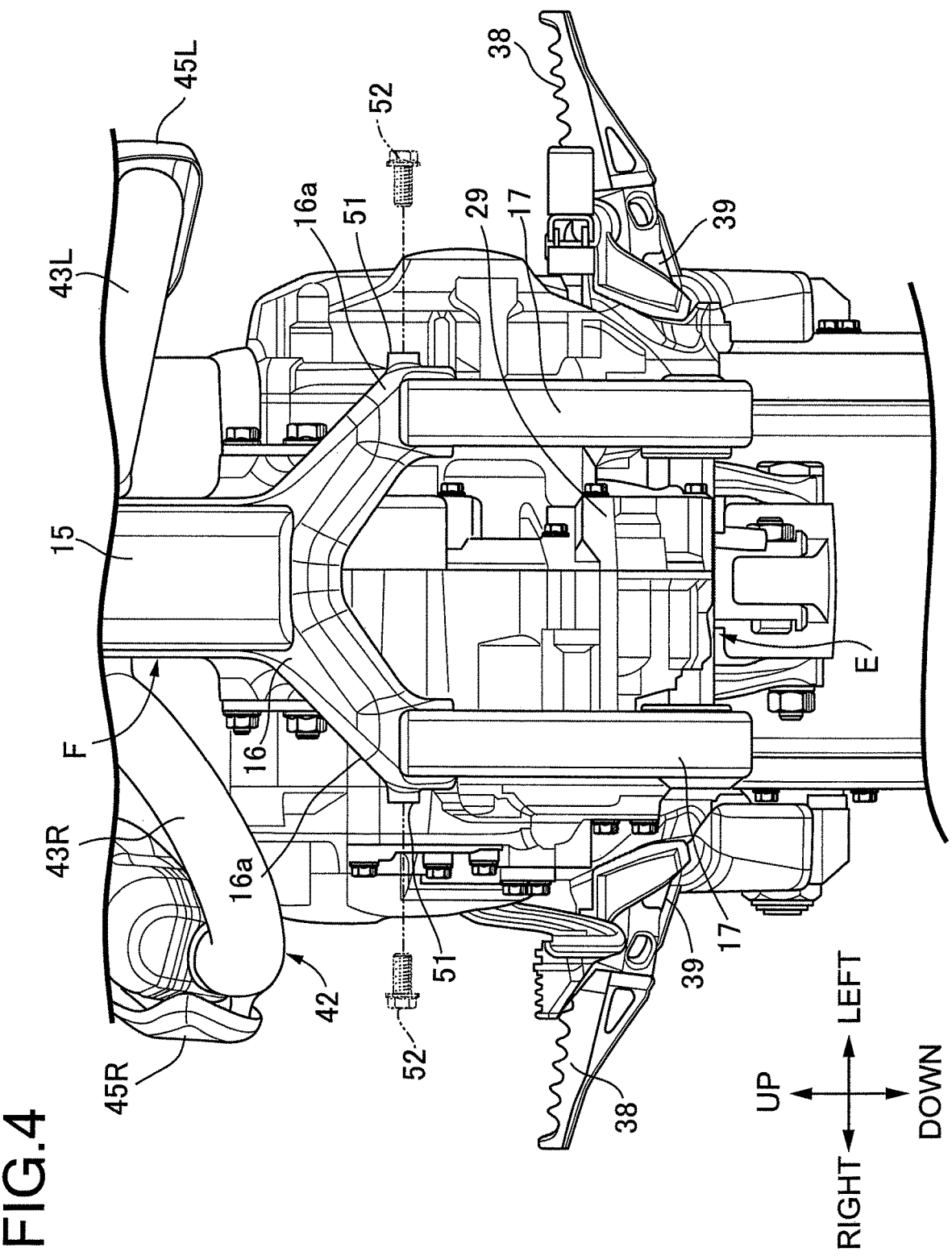
FIG. 4 is a front view corresponding to FIG. 3 where a guard member is omitted.

The following describes an embodiment of the present invention with reference to the accompanying FIG. 1 to FIG. 9. The following description defines the up, down, front, rear, right, and left as directions viewed from an occupant riding on a two-wheeled motor vehicle.

First, in FIG. 1 to FIG. 4, a body frame F of the two-wheeled motor vehicle as a saddle-ridden vehicle includes a front fork 11, a head pipe 13, a pair of left and right main frames 14, a single down frame 15, a pair of left and right lower frames 17, a pair of left and right pivot frames 18, and a pair of left and right seat rails 19. The front fork 11 journals a front wheel WF. The head pipe 13 steerably supports a bar-shaped steering handlebar 12. The main frames 14 extend downward to the rear from the head pipe 13. The down frame 15 extends downward to the rear from the head pipe 13 at an angle steeper than those of the main frames 14. The lower frames 17 are disposed continuous with the lower end portion of the down frame 15 via a joint 16 and extend rearward. The pivot frames 18 couple between the rear end portions of the main frames 14 and the rear end portions of the lower frames 17 and extend in an up-down direction. The seat rails 19 extend rearward from the upper end portions of the pivot frames 18. The joint 16 has a pair of left and right branching portions 16a branched downward and is integrally disposed continuous with the lower end portion of the down frame 15.

An engine E as a to-be-cooled body is disposed in a space surrounded by the main frames 14, the down frame 15, the joint 16, the lower frames 17, and the pivot frames 18. The front portion of this engine E is supported to the joint 16 via a first engine hanger 20, the lower portion of the engine E is supported to a second engine hanger 21 disposed at the lower frames 17, and the upper portion of the engine E is supported to the upper portions of the pivot frames 18 via a third engine hanger 22.

At the lower portions of the pair of left and right pivot frames 18, front portions of a swing arm 23, which journal a rear wheel WR by the rear end portions, are supported to be swingable up and down via a pivot 24. A link mechanism 26 is disposed between a lower cross member 25 (see FIG. 5), which couples between the lower end portions of the pair of left and right pivot frames 18, and the swing arm 23. A cushion unit 28 is disposed between an upper cross member (not illustrated), which couples between the front end portions of the seat rails 19, and a link member 27, which constitutes a part of the link mechanism 26.

The engine E includes a crankcase 29 inside of which a transmission (not illustrated) is housed. An output shaft 30 of the transmission projects to the left side from the crankcase 29. Transmission means 33 using an endless chain 32 is disposed between the output shaft 30 and an axle shaft 31 of the rear wheel WR.

A fuel tank 36 is disposed above the engine E and on both the main frames 14, and a riding seat 37 is located at the rear of the fuel tank 36 so as to be supported by the seat rails 19.

Respective step holders 39, which support steps 38 and are located below the pivot 24, abut against and are secured to outer surfaces on the lower portions of the pair of left and right pivot frames 18.

An intake device 41 is coupled to a rear sidewall of a cylinder head 40 of the engine E, and an exhaust system 42 is coupled to a front sidewall of the cylinder head 40. This exhaust system 42 includes a pair of left and right exhaust pipes 43L, 43R and a pair of left and right exhaust mufflers 44. The exhaust pipes 43L, 43R meander from the front sidewall of the cylinder head 40 into the left and right sides and extend rearward. The exhaust mufflers 44 are coupled to the downstream ends of the exhaust pipes 43L, 43R so as to constitute the downstream end of the exhaust system 42. On the lateral sides of the cylinder head 40, which are the intermediate portions of the exhaust pipes 43L, 43R, are covered with heat shield covers 45L, 45R from the outer side portions, respectively.

Figure 5:
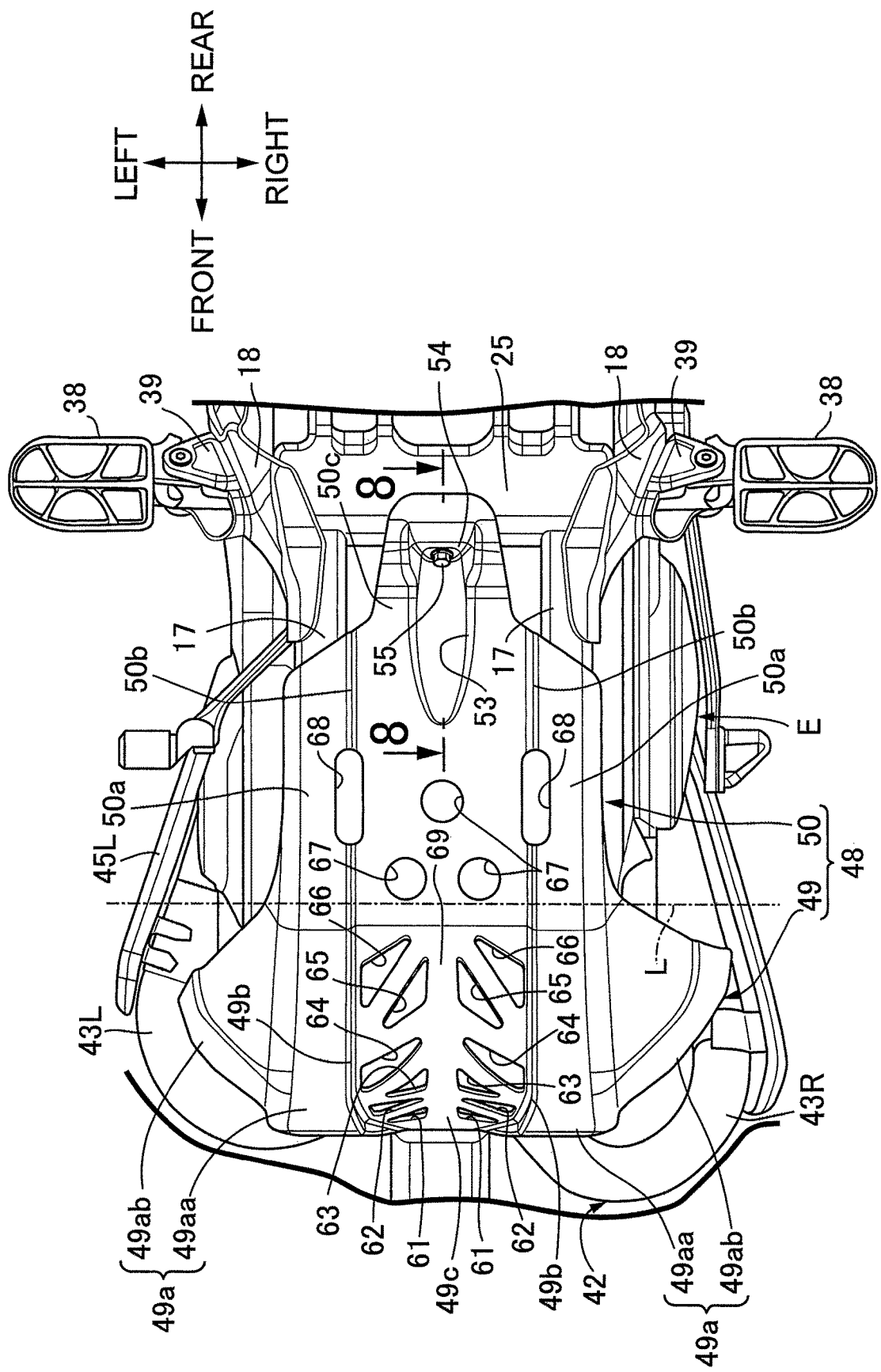
FIG. 5 is a bottom view viewed from an arrow 5 in FIG. 2.
Figure 6:
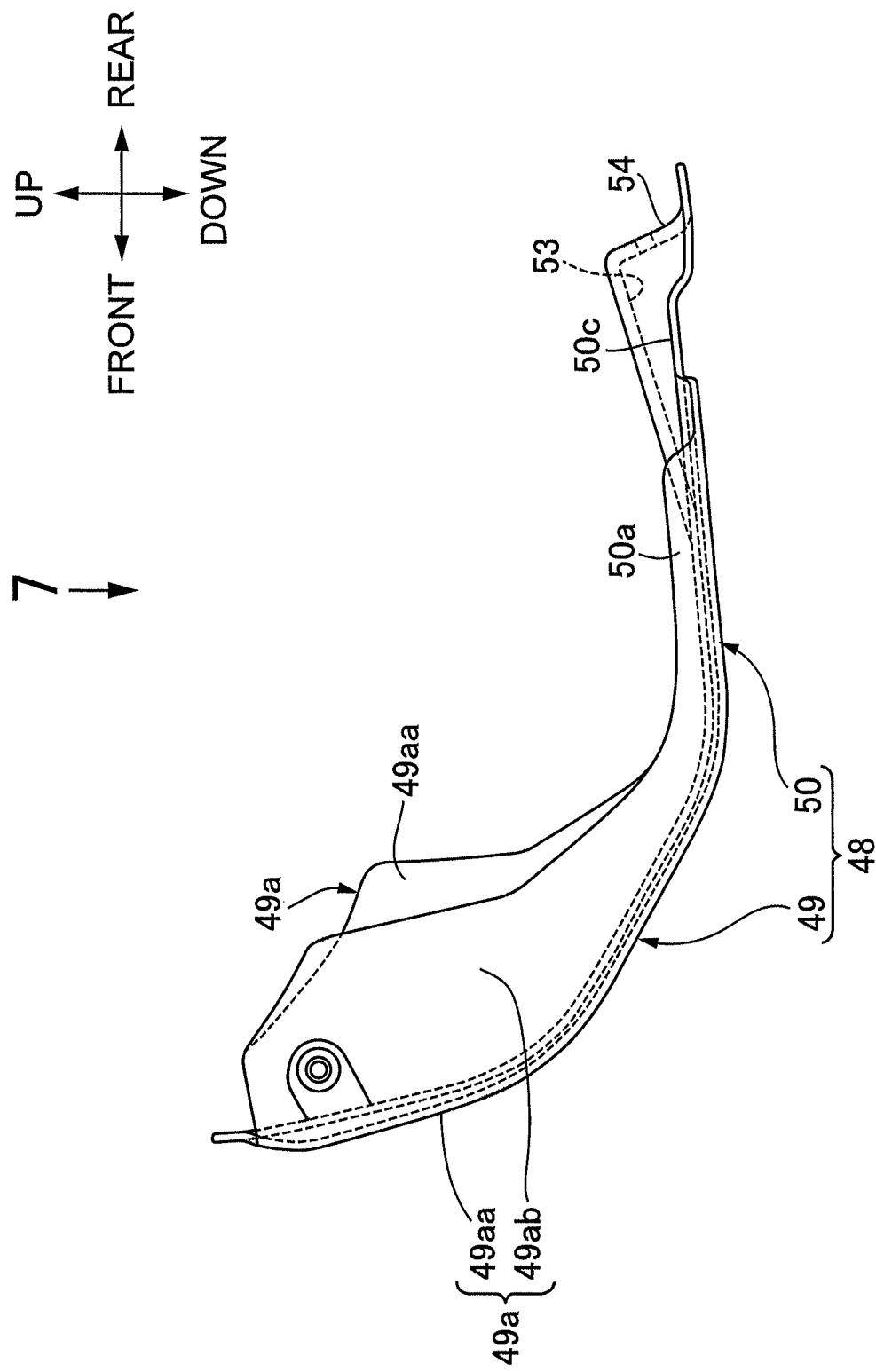
FIG. 6 is a side view of the guard member.
Figure 7:
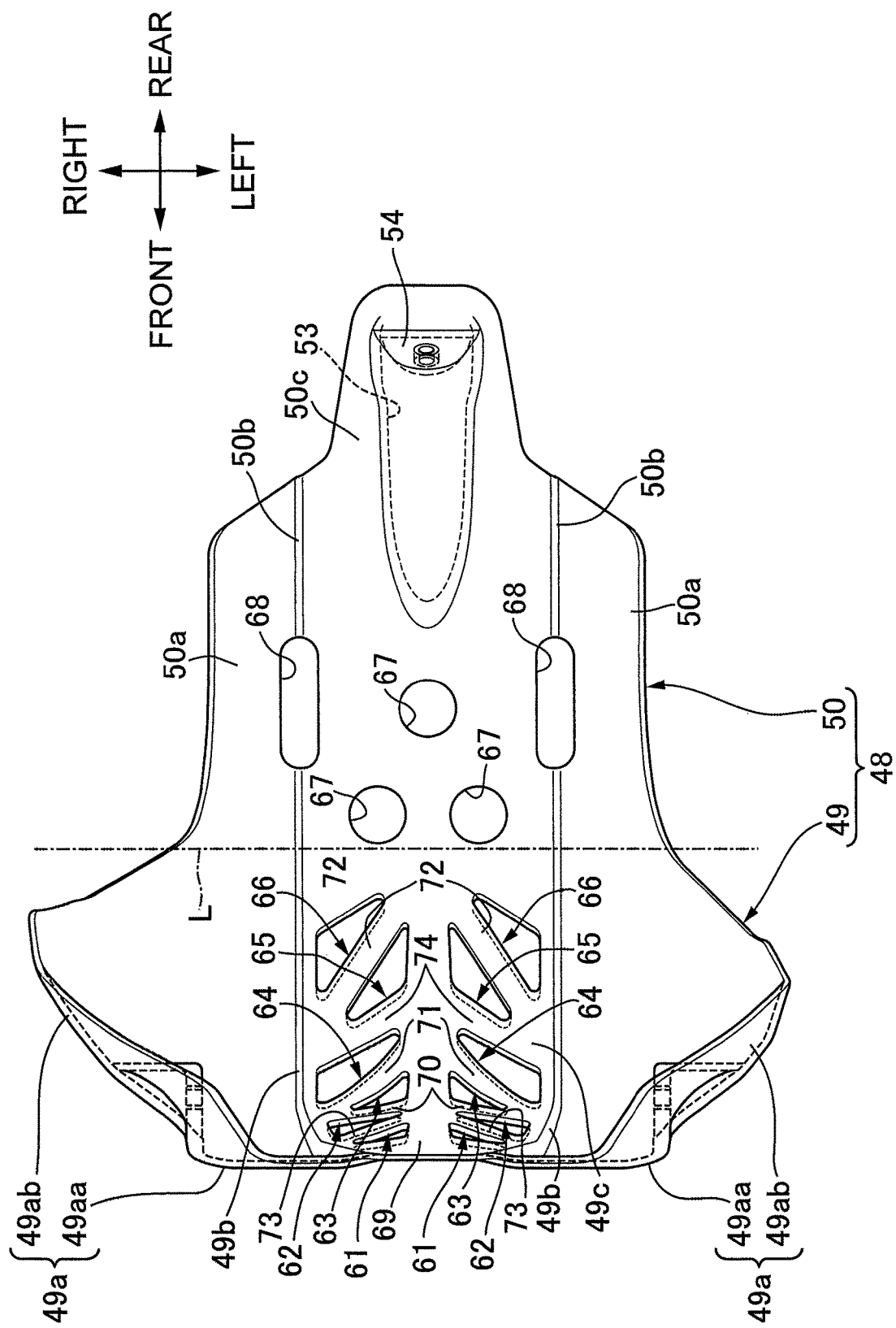
FIG. 7 is a plan view viewed from an arrow 7 in FIG. 6.

With reference to FIG. 5 to FIG. 7 together, to the body frame F, a guard member 48 is supported which straddles over the pair of left and right lower frames 17 as the pair of left and right frame members configuring part of this body frame F. This guard member 48 is located at the rear of the front wheel WF so as to protect at least the front portion of the engine E.

The guard member 48 made of synthetic resin is formed by integrally including a front wall 49, which is located in front of the lower portion of the engine E, and a bottom wall 50 (a part rearward with respect to a straight line L in FIG. 5 and FIG. 7), which extends in the front-rear direction below the engine E and is continuous with the front wall 49. The front wall 49 integrally includes a pair of left and right bulge portions 49a and a flat plate-shaped center portion 49c. The bulge portions 49a curve so as to bulge forward as seen in side view and are located in front of the lower portion of the engine E. The center portion 49c is disposed continuous with the bulge portions 49a via step portions 49b. The center portion 49c is also curvedly formed so as to bulge forward corresponding to both of the left and right bulge portions 49a.

The bulge portions 49a are formed including frame cover parts 49aa and projecting parts 49ab. The frame cover parts 49aa having a substantially L shape in a cross-section cover the lower frames 17 from the front side and outside. The projecting parts 49ab project out from the frame cover parts 49aa to the outer side so as to cover part of the engine E protruding from the lower frames 17 to the outer side, as seen in front view. Bolts 52, which are inserted through the upper portions of the frame cover parts 49aa, are screwed into and fastened to boss portions 51 protrusively provided on the outside of upper portions of the lower frames 17 to secure the front wall 49 to the lower frames 17.

The center portion 49c is located between the pair of left and right lower frames 17. The pair of left and right frame cover parts 49aa are disposed continuous with both of the left and right sides of the center portion 49c via the step portions 49b, which are located inside the lower frames 17.

Although the left and right bulge portions 49a are formed asymmetrically due to a relationship with peripheral members of the guard member 48, identical reference numerals are given to the left and right members for simplification of illustration.

The bottom wall 50 integrally includes a pair of left and right frame cover portions 50a and a flat plate portion 50c. The frame cover portions 50a are integrally continuous with the rear ends of the frame cover parts 49aa of the bulge portions 49a of the front wall 49 and extend rearward. The flat plate portion 50c extends rearward from the lower end portion of the center portion 49c of the front wall 49 and is disposed continuous with the pair of left and right frame cover portions 50a via step portions 50b. These step portions 50b of the bottom wall 50 are formed so as to extend rearward integrally continuous with the step portions 49b of the front wall 49.

With reference to FIG. 8 together, a recess 53 depressed upward is formed at the center portion in the vehicle width direction of a lower surface of a rear part of the flat plate portion 50c of the bottom wall 50. The recess 53 is formed extending in the front-rear direction so as to deepen to the rear. A mounting wall 54 that closes the rear end of this recess 53 is disposed integrally with the flat plate portion 50c. The mounting wall 54 is abutted, from forward, against the front surface of the center portion in the vehicle width direction of the lower cross member 25 in the body frame F. A bolt 55 inserted from the recess 53 side through the mounting wall 54 is screwed with and fastened to the lower cross member 25 to secure the bottom wall 50 to the lower cross member 25.

The guard member 48 has a first plurality of, for example, seventeen through-holes 61, 62, 63, 64, 65, 66, 67, 68 to cause travelling air, which cools an oil accumulation at the bottom portion of the engine E, to flow through. As part of the first plurality of through-holes, a second plurality of, for example, twelve of the first to sixth through-holes 61 to 66 are each formed into a non-circular shape having at least one linearly extending linear edge portion.

The non-circular through-holes are triangular through-holes having three linear edge portions and one obtuse angle among three apex angles. Six pairs of the triangular first to sixth through-holes 61 to 66 are provided from the top downward such that the first through-hole 61 is disposed on the uppermost and the sixth through-hole 66 is disposed on the lowermost, on the center portion 49c of the front wall 49. A linearly extending center rib 69 is formed at the center part in the vehicle width direction at the center portion 49c of the front wall 49 of the guard member 48. The first to sixth through-holes 61 to 66 are located symmetrical with respect to the center rib 69.

Figure 9:
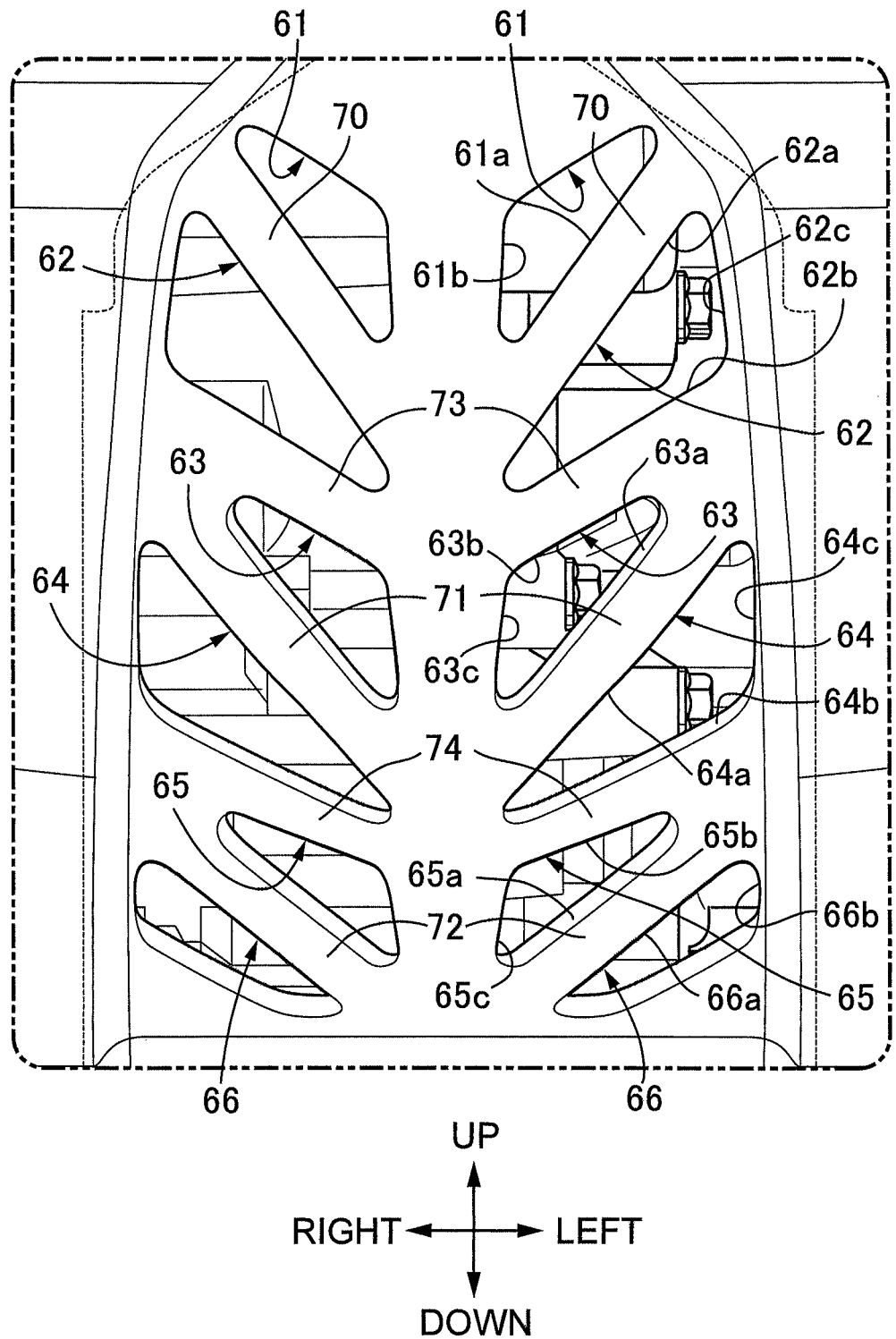
FIG. 9 is an enlarged view viewed from an arrow 9 in FIG. 3.

In FIG. 9, the through-holes 61 to 66 each have three linear edge portions, one of the three linear edge portions corresponding to first linear edge portions 61a, 62a, 63a, 64a, 65a, 66a, respectively, which each correspond to the long side of the triangle in this embodiment. The first to sixth through-holes 61 to 66 are arranged so that linear ribs 70, 71, 72 are respectively formed between the respective first linear edge portions 61a, 62a, 63a, 64a, 65a, 66a of adjacent through-holes 61, 62; 63, 64; 65, 66 among the first to sixth through-holes 61 to 66 and, for example, the respective first linear edge portions 61a, 62a, 63a, 64a, 65a, 66a of the adjacent through-holes 61, 62; 63, 64; 65, 66 face each other in parallel, respectively.

In this embodiment, the first and second through-holes 61, 62 have the first linear edge portions 61a, 62a facing each other and adjacent up and down, the third and fourth through-holes 63, 64 have the first linear edge portions 63a, 64a facing each other and adjacent up and down, and the fifth and sixth through-holes 65, 66 have the first linear edge portions 65a, 66a facing each other and adjacent up and down. That is, the linear ribs 70, 71, 72 are formed between the first and second through-holes 61, 62, between the third and fourth through-holes 63, 64, and between the fifth and sixth through-holes 65, 66, respectively.

Among the three linear edge portions each provided in the second to fifth through-holes 62 to 65, second linear edge portions 62b, 63b, 64b, 65b as one of remaining two linear edge portions excluding the first linear edge portions 62a to 65a form linear ribs 73, 74 between the adjacent through-holes among the second to fifth through-holes 62 to 65 and face each other, for example, in parallel. That is, the second linear edge portions 62b, 63b of the second and third through-holes 62, 63 form the linear ribs 73 between them and face each other in parallel. The second linear edge portions 64b, 65b of the fourth through-holes and the fifth through-holes 64, 65 form the linear ribs 74 between them and face each other in parallel.

Moreover, the first to sixth through-holes 61 to 66 are provided on the guard member 48 such that the linear ribs are integrally continuous with other linear ribs and the locations of the first to sixth through-holes 61 to 66 are configured as follows. One end portions of the linear ribs 70 between the first and second through-holes 61, 62 are integrally continuous with the center rib 69 and one end portions of the linear ribs 73 between the second and third through-holes 62, 63. One end portions of the linear ribs 71 between the third and fourth through-holes 63, 64 are integrally continuous with the center rib 69 and one end portions of the linear ribs 74 between the fourth and fifth through-holes 64, 65. One end portions of the linear ribs 72 between the fifth and sixth through-holes 65, 66 are integrally continuous with the center rib 69.

Among the three linear edge portions provided in each of the selected through-holes, which are the first, third, and fifth through-holes 61, 63, 65 in this embodiment, among the first to sixth through-holes 61 to 66, remaining linear edge portions of the adjacent triangular through-holes excluding the linear edge portions, for example, facing each other in parallel, namely, the first linear edge portions 61a of the first through-holes 61, the first and second linear edge portions 63a, 63b of the third through-holes 63, and the first and the second linear edge portions 65a, 65b of the fifth through-holes 65 are located along the center rib 69. In this embodiment, the second linear edge portions 61b of the first through-holes 61, the third linear edge portions 63c of the third through-holes 63, and the second linear edge portions 65b of the fifth through-holes 65 are located along the center rib 69.

Among the three linear edge portions provided in each of remaining through-holes excluding the selected first, third, and fifth through-holes 61, 63, 65, which are the second, fourth, and sixth through-holes 62, 64, 66 in this embodiment, among the first to the sixth through-holes 61 to 66, remaining linear edge portions of the adjacent triangular through-holes excluding the linear edge portions, for example, facing each other in parallel, namely, the first and the second linear edge portions 62a, 62b of the second through-holes 62, the first and the second linear edge portions 64a, 64b of the fourth through-holes 64, and the first linear edge portions 66a of the sixth through-holes 66 are located along the center rib 69. In this embodiment, the third linear edge portions 62c of the second through-holes 62, the third linear edge portions 64c of the fourth through-holes 64, and the second linear edge portions 66b of the sixth through-holes 66 are located along the bulge portions 49a.

The three seventh through-holes 67 and the pair of eighth through-holes 68 are provided on the bottom wall 50 of the guard member 48. The seventh through-holes 67 are provided on the front portion of the flat plate portion 50c of the bottom wall 50 formed into the circular shapes so as to be located at tops of an imaginary triangle. The eighth through-holes 68 are formed into elongate holes long in the front-rear direction and are provided from the flat plate portion 50c of the bottom wall 50 to the frame cover portions 50a.

Moreover, the total opening area of the first to sixth through-holes 61 to 66 disposed on the front wall 49 among the first to eighth through-holes 61 to 68, seventeen in total, is configured larger than the total opening area of the seventh and eighth through-holes 67, 68 provided on the bottom wall 50.

Next, the following describes the operation of this embodiment. The first plurality (seventeen in this embodiment) of the first to eighth through-holes 61 to 68 are provided on the guard member 48, which straddles over the pair of left and right lower frames 17 and is supported to the body frame F. The second plurality (twelve in this embodiment) of the first to sixth through-holes 61 to 66 as part of the first to eighth through-holes 61 to 68 each include at least one linearly extending linear edge portion and are formed into the non-circular shapes. The locations of the first to sixth through-holes 61 to 66 are configured such that the linear ribs 70, 71, 72, 73, 74 are formed respectively between the linear edge portions, for example, facing each other in parallel of adjacent ones of the first to sixth through-holes 61 to 66. Therefore, the first to sixth through-holes 61 to 66 are approximated to one another while the strength of the guard member 48 is secured with the linear ribs 70 to 74 to provide the more non-circular through-holes on the guard member 48, ensuring increasing the opening areas. Additionally, the larger amount of travelling air can be guided to the engine E side while the engine E is protected from, for example, a small stone jumped up by the front wheel WF.

The non-circular shaped first to sixth through-holes 61 to 66 are provided on the guard member 48 such that the linear ribs 70 to 74 are integrally continuous with the other linear ribs. This allows securing the strength of the guard member 48 while the areas occupied by the linear ribs 70 to 74 are decreased and the opening areas are increased.

The non-circular through-holes are formed into triangles each having three linear edge portions, and the first linear edge portions 61a, 62a, 63a, 64a, 65a, 66a corresponding to the long sides of the triangles are located such that the first linear edge portions 61a, 62a, 63a, 64a, 65a, 66a of the adjacent triangular through-holes respectively face each other in parallel, for example. The triangles are configured such that the three sides are in contact with an outer periphery of an imaginary circle corresponding to a circular through-hole blocking passing of, for example, a small stone to allow increasing the opening areas of the triangular first to sixth through-holes 61 to 66 while blocking the passing of, for example, the small stone. Additionally, the first linear edge portions 61a to 66a corresponding to the long sides of triangles form the linear ribs 70, 71, 72 between them and face each other in parallel, for example. This enhances an efficiency to locate the triangular first to sixth through-holes 61 to 66 and provides the more triangular through-holes on the guard member 48, thus ensuring further increasing the opening areas of the guard member 48.

Moreover, since one of the three apex angles of the triangle is configured to be the obtuse angle, the first linear edge portions 61*a* to 66*a* corresponding to the long sides of the triangles can be lengthened and the opening areas of the triangular first to sixth through-holes 61 to 66 can be further increased.

The guard member 48 includes the linearly extending center rib 69 at the center portion in the vehicle width direction. Among the three linear edge portions provided in each of the selected through-holes, which are the first, third, and fifth through-holes 61, 63, 65 in this embodiment, among the first to sixth through-holes 61 to 66, remaining linear edge portions of the adjacent triangular through-holes excluding the linear edge portions facing each other, namely, the second linear edge portions 61*b* of the first through-holes 61, the third linear edge portions 63*c* of the third through-holes 63, and the second linear edge portions 65*b* of the fifth through-holes 65 are located along the center rib 69. This allows enhancing an efficiency to locate the triangular first to sixth through-holes 61 to 66 while the center rib 69 receives, for example, dirt jumped up by the front wheel WF to effectively block the jumping of the dirt to the engine E side.

The guard member 48 made of synthetic resin integrally includes the pair of left and right bulge portions 49*a*, which are located in front of the lower portion of the engine E so as to curvedly bulge forward as seen in side view, and the center portion 49*c*, which is disposed continuous with the bulge portions 49*a* via the step portions 49*b* such that the first to sixth through-holes 61 to 66 are disposed. Among the three linear edge portions provided in each of remaining through-holes excluding the first, third, and fifth through-holes 61, 63, 65 as the selected through-holes among the first to sixth through-holes 61 to 66, namely, the second, fourth, and sixth through-holes 62, 64, 66, remaining linear edge portions of the adjacent triangular through-holes excluding the linear edge portions facing each other, namely the third linear edge portions 62*c* of the second through-holes 62, the third linear edge portions 64*c* of the fourth through-holes 64, and the second linear edge portions 66*b* of the sixth through-holes 66 are located along the bulge portions 49*a*. The step portions 49*b* are interposed between the center portion 49*c* and the left and right bulge portions 49*a*, and the linear edge portions 62*c*, 64*c*, 66*b* of part of the triangular through-holes, namely, the second, fourth, and sixth through-holes 62, 64, 66 run along the step portions 49*b*. Thus, the weight of the guard member 48 can be reduced while the strength of the guard member 48 is secured.

Since the first to sixth through-holes 61 to 66 are located symmetrical with respect to the center rib 69, the travelling air equally blows the entire engine E, thereby ensuring equally cooling the entire engine E.

Further, the guard member 48 integrally has the front wall 49, which is located in front of the lower portion of the engine E, and the bottom wall 50, which extends in the front-rear direction below the engine E and is, continuous with the front wall 49. Additionally, among the first to eighth through-holes 61 to 68, seventeen in total, the total opening area of the first to sixth through-holes 61 to 66 provided on the front wall 49 are set larger than the total opening area of the seventh and the eighth through-holes 67, 68 provided on the bottom wall 50. Therefore, the travelling air taken from the front wall 49 can be flown rearward along the bottom wall 50, and this allows providing the good taking of the travelling air from the front wall 49 while the cooling of the engine E is promoted.

The embodiment of the present invention has been described above. The present invention is not limited to the above-described embodiment. Various changes of design are possible without departing from the gist of the present invention.

For example, while the above-described embodiment has described the two-wheeled motor vehicle to which the engine E as the to-be-cooled body is mounted, the to-be-cooled body may be an electric motor or a battery, and the present invention is applicable to a three-wheeled motor vehicle to which the to-be-cooled body is mounted.

What is claimed is:

1. A to-be-cooled body protection structure of a saddle-ridden vehicle, in which a to-be-cooled body requiring cooling with a travelling air is supported to a body frame including a front fork and a head pipe at a front end portion of the body frame, the front fork journaling a front wheel, the head pipe steerably supporting a steering handlebar, and a guard member straddles over a pair of left and right frame members configuring a part of the body frame, the guard member being supported to the body frame and located at a rear of the front wheel so as to protect at least a front portion of the to-be-cooled body, wherein a first plurality of through-holes are provided on the guard member, wherein a second plurality of through-holes as part of the first plurality of through-holes each include at least one linear edge portion linearly extending, and are formed into non-circular shapes, wherein the non-circular through-holes are arranged such that linear ribs are formed between linear edge portions, as said linear edge portion, facing each other of adjacent ones of the non-circular through-holes, wherein the non-circular through-holes are formed into triangles, each having three linear edge portions as said linear edge portion, and wherein the linear edge portions corresponding to long sides of the triangles of adjacent ones of the triangular through-holes are located so as to face each other.

2. The to-be-cooled body protection structure of a saddle-ridden vehicle according to claim 1, wherein the non-circular through-holes are provided on the guard member such that the linear ribs are integrally continuous with other linear ribs, respectively.

3. The to-be-cooled body protection structure of a saddle-ridden vehicle according to claim 1, wherein the triangles have three apex angles, one of which is set to be an obtuse angle.

4. The to-be-cooled body protection structure of a saddle-ridden vehicle according to claim 1, wherein the guard member includes a center rib linearly extending at a center portion in a vehicle width direction, and wherein among the three linear edge portions provided in each of the through-holes selected among the second plurality of triangular through-holes, remaining linear edge portions excluding the linear edge portions facing one another of adjacent ones of the selected triangular through-holes are located along the center rib.

5. The to-be-cooled body protection structure of a saddle-ridden vehicle according to claim 3, wherein the guard member includes a center rib linearly extending at a center portion in a vehicle width direction, and wherein among the three linear edge portions provided in each of the through-holes selected among the second plurality of triangular through-holes, remaining linear edge portions excluding the linear edge portions facing one another of adjacent ones of the selected triangular through-holes are located along the center rib.

6. The to-be-cooled body protection structure of a saddle-ridden vehicle according to claim 4, wherein the guard member made of a synthetic resin integrally includes a pair of left and right bulge portions and a center portion, the pair of left and right bulge portions being located in front of a lower portion of the to-be-cooled body so as to curvedly bulge forward as seen in side view, and the center portion being disposed continuous with the bulge portions via step portions such that the second plurality of through-holes are provided, and wherein among the three linear edge portions provided in each of remaining through-holes excluding the selected through-holes among the second plurality of triangular through-holes, remaining linear edge portions excluding the linear edge portions facing one another of adjacent ones of said triangular through-holes are located along the bulge portions.

7. The to-be-cooled body protection structure of a saddle-ridden vehicle according to claim 5, wherein the guard member made of a synthetic resin integrally includes a pair of left and right bulge portions and a center portion, the pair of left and right bulge portions being located in front of a lower portion of the to-be-cooled body so as to curvedly bulge forward as seen in side view, and the center portion being disposed continuous with the bulge portions via step portions such that the second plurality of through-holes are provided, and wherein among the three linear edge portions provided in each of remaining through-holes excluding the selected through-holes among the second plurality of triangular through-holes, remaining linear edge portions excluding the linear edge portions facing one another of adjacent ones of said triangular through-holes are located along the bulge portions.

8. The to-be-cooled body protection structure of a saddle-ridden vehicle according to claim 4, wherein the second plurality of through-holes are located symmetrical with respect to the center rib.

9. The to-be-cooled body protection structure of a saddle-ridden vehicle according to claim 5, wherein the second plurality of through-holes are located symmetrical with respect to the center rib.

10. The to-be-cooled body protection structure of a saddle-ridden vehicle according to claim 1, wherein the guard member integrally has a front wall and a bottom wall, the front wall being located in front of the lower portion of the to-be-cooled body, the bottom wall extending in a front-rear direction below the to-be-cooled body and being continuous with the front wall, and wherein the through-holes provided on the front wall among the first plurality of through-holes have a total opening area set larger than a total opening area of the through-holes provided on the bottom wall.

\* \* \* \* \*